United States Patent [19]

Nakamura et al.

[11] Patent Number: 4,833,717
[45] Date of Patent: May 23, 1989

[54] VOICE SPECTRUM ANALYZING SYSTEM AND METHOD

[75] Inventors: Shogo Nakamura, Matsudo; Tomofumi Nakatani, Yokohama, both of Japan

[73] Assignee: Ricoh Company, Ltd., Tokyo, Japan

[21] Appl. No.: 932,602

[22] Filed: Nov. 20, 1986

[30] Foreign Application Priority Data

Nov. 21, 1985 [JP] Japan ............................ 60-262052
Aug. 26, 1986 [JP] Japan ............................ 61-199735

[51] Int. Cl.$^4$ ................... G10L 9/02; G10R 23/16
[52] U.S. Cl. ................................. 381/50; 324/77 B
[58] Field of Search ..................... 381/36–50; 324/77 R, 77 F, 77 B; 364/513.5, 512, 724

[56] References Cited

U.S. PATENT DOCUMENTS

| | | | |
|---|---|---|---|
| 2,672,512 | 3/1954 | Mathes | 381/50 |
| 2,938,079 | 5/1960 | Flanagan | 381/50 |
| 2,990,453 | 6/1961 | Flanagan | 381/50 |
| 3,165,586 | 1/1965 | Campanella | 324/77 B |
| 3,335,225 | 8/1967 | Campanella et al. | 381/50 |
| 3,539,726 | 11/1970 | Bolie | 381/45 |
| 3,786,188 | 1/1974 | Allen | 381/36 |
| 4,640,134 | 2/1987 | Simmons | 324/77 B |

*Primary Examiner*—Vit W. Miska
*Attorney, Agent, or Firm*—Mason, Fenwick & Lawrence

[57] ABSTRACT

A voice spectrum analyzing method and system subjects a voice signal to frequency analysis by passing the voice signal through a filter bank containing a plurality of band pass filters each having a different band pass filter range to produce a voice spectral pattern over a predetermined frequency range. The voice spectral pattern is sampled at a predetermined sampling time interval successively, and each of the sampled voice spectral patterns is stored for a predetermined time period. While the voice spectral pattern is retained, it is scanned once in a predetermined time sequence, thereby forming an approximate periodic signal from a series of the scanned voice spectral voice patterns. And the periodic signal thus formed is then digitized and filtered through a digital high pass filter, thereby obtaining a high frequency component from the periodic signal which indicates a feature parameter of the voice signal.

13 Claims, 7 Drawing Sheets

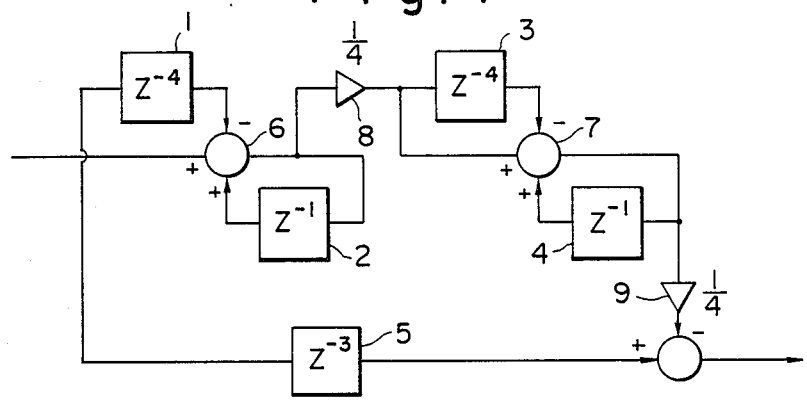
Fig. 1
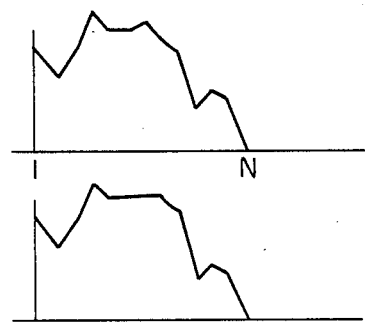
Fig. 2a #1
Fig. 2b #2
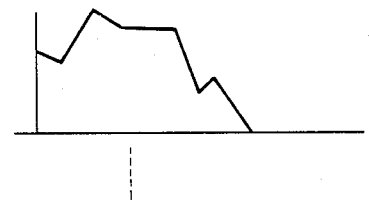
Fig. 2c #3
Fig. 3

VOICE SPECTRUM ANALYZING SYSTEM AND METHOD

CROSS REFERENCE TO RELATED APPLICATIONS

This application is related to U.S. patent application Ser. No. 06/713,465, entitled "EXTRACTION OF PHONEMIC INFORMATION" and filed Mar. 19, 1985, the disclosure of which is incorporated herein by reference. The above-identified application has been assigned to the assignee of this application.

BACKGROUND OF THE INVENTION

1. Field of the Invention

This invention generally relates to a voice data processing system and method, and, in particular, to a system and method for extracting local peaks as voice features from a voice time spectral pattern in the form of a frequency distribution pattern developed in a voice recognition technique.

2. Description of the Prior Art

As described in the above-identified copending application, a voice signal when plotted in the form of a frequency distribution pattern typically includes a relatively high frequency component and a relatively low frequency component. Thus, by forming a periodic signal from a detected voice signal and passing the thus formed periodic signal through a high pass filter, the high frequency component of the voice signal can be extracted and this may be used to recognize the voice signal by comparison with a set of known, stored data. In accordance with the teaching of the above-identified copending application, a frame or a set of frequency data is sampled at a particular point in time and this frame is arranged serially by inverting alternately to produce a triangular shaped periodic signal, which is then passed though a high pass filter to obtain the high frequency component or local peak of the original voice signal to be used in recognition of the input voice data.

The technique disclosed in the above-identified copennding application allows to carry out recognition of input, unknown voice at high accuracy. However, since the same frame must be used repetitively to produce a periodic signal, it requires either a high-speed system which tends to be expensive or a relatively long time for processing of a voice signal.

SUMMARY OF THE INVENTION

In accordance with the present invention, there is provided a voice signal processing method and system in which a voice signal having a relatively low frequency component and a relatively high frequency component is sampled periodically at a predetermined time interval over a predetermined frequency range, thereby producing a series of sampled voice data, which is then passed through a high pass filter to extract the relatively high frequency component as a feature quantity of said voice signal. Preferably, a voice signal, for example, obtained from a transducer, such as a microphone, is first subjected to frequency analysis, for example, by a filter bank having a plurality of band pass filters each having a different frequency range. The frequency analysis is carried out periodically at a predetermined time interval, so that a set of data called a frame having a frequency spectral distribution is produced periodically. For this purpose, sampling of the voice signal is carried out repetitively at a predetermined time interval. As a result, there is produced a series of voice patterns as a function of time and each of the voice pattern corresponds to each frame sampled at a particular point in time. Such a series of voice patterns may be viewed as an approximate periodic signal because the adjacent frames in the voice signal have been found to differ unappreciably. It is to be noted that such sampling can be carried out either from a low (or high) frequency end to a high (or low) frequency end repetitively or between a high and low frequency ends reciprocatingly.

In the preferred embodiment, the thus formed series of voice patterns is converted into digital data by analog-to-digital conversion processing, and the thus converted digital data is passed through a high pass filter, whereby only the relatively high frequency component of the voice signal can be extracted. In accordance with the present invention, since a multiple of frames produced in sequence are used to form a psuedo-periodic signal comprised of a series of voice patterns and to be passed through a high pass filter, the scanning of the plurality of band pass filters is required to be carried out once. This is particularly advantageous because no high-speed processing is required in the present invention. On the other hand, in accordance with the technique proposed in the copending application mentioned above, the scanning of the band pass filters must be carried out at least twice or more, typically four times, so as to define a periodic signal to be passed through a high pass filter for elimination of the relatively low frequency component of the voice signal. Therefore, the approximation technique proposed by the present invention is especially advantageous in designing a hardware circuitry or a software program in processing a voice signal for use in voice recognition.

It is therefore a primary object of the present invention to obviate the disadvantage of the prior art as described above and to provide an improved voice processing method and system.

Another object of the present invention is to provide an improved voice spectrum analyzing method and system simple in structure, easy to manufacture and inexpensive to implement.

A further object of the present invention is to provide an improved method and system for extracting a relatively high frequency component from an input signal having both of a relatively low and a relatively high frequency components.

A still further object of the present invention is to provide an approximation method for extracting a feature data from a voice signal for use in a voice recognition system.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing a high pass filter suitable for use in a voice spectrum analyzing method and system of the present invention;

FIGS. 2a through 2c are graphs each showing a time-frequency voice distribution pattern obtained by subjecting a voice signal to time frequency over a predetermined frequency range at a particular point in time;

FIG. 3 is a graph showing a series of voice patterns as shown in FIGS. 2a through 2c when obtained by scanning a plurality of band pass filters from a low frequency end to a high frequency end periodically at a timed sequence in accordance with one embodiment of the present invention;

DESCRIPTION OF THE PREFERRED EMBODIMENTS

In recognizing an unknown voice, a voice signal is produced by a transducer, such as microphone, and the voice signal is subjected to frequency analysis over a predetermined frequency range. In this case, typically use is made of a filter bank including a plurality of band pass filters each having an individual band pass frequency range. The frequency analysis is carried out periodically at a timed sequence by sampling the voice signal at a timed sequence. Thus, there is produced a series of frames as a function of time. Each frame includes one data obtained from each of the plurality of band pass filters so that a plurality of frames arranged in the order of occurrence as a function of time define a time-frequency distribution, often referred to as voice spectrum pattern. Such a frame may be viewed as a frequency-level distribution pattern at a particular point in time or a particular time interval, wherein the level indicates a parameter determined by each band pass filter, such as amplitude or power. Such a time spectral pattern includes a local peak which is typically defined by its high frequency component and which defines a feature of a particular voice. Thus, if a set of such local peaks for known voices are stored, an unkown voice signal may be processed to extract its local peak which is then compared with each of the stored local peaks to identify its unknown voice.

Figure 14:
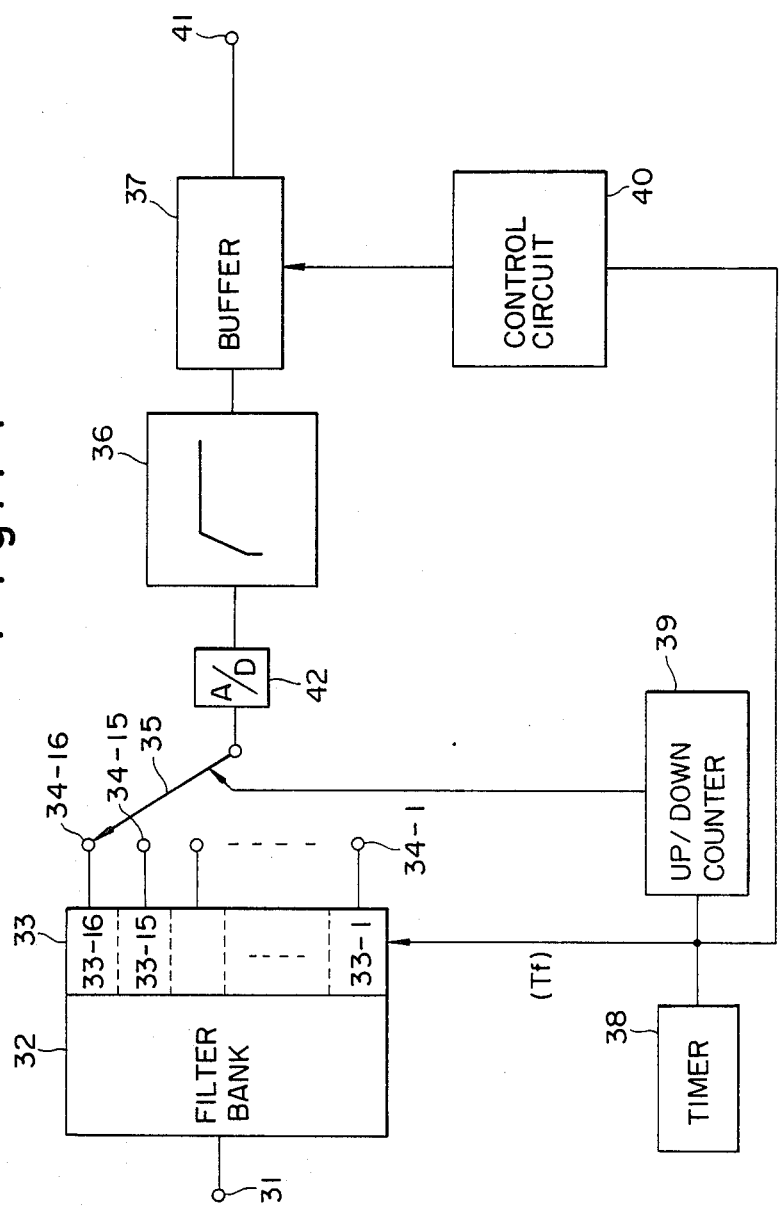
FIG. 14 is a schematic illustration showing a voice spectrum analyzing system constructed in accordance with one embodiment of the present invention.

Referring now to FIG. 14, there is shown a voice spectrum analyzing system constructed in accordance with one embodiment of the present invention. As shown, the illustrated system includes an input terminal 31 for receiving a voice signal. It is to be noted that, as well known for one skilled in the art, such a voice signal may be obtained by using a transducer, such as a microphone, which converts a voice or sound in the form of pressure waves into an voice signal in the form of an electrical signal. The input terminal is connected to an N-channel filter bank 32 as a frequency analyzer. In the illustrated embodiment, the filter bank 32 is assumed to include 15 channels so that there are 15 band pass filters each having a different frequency range between 250 Hz and 6.3 kHz at ⅓ Oct and $Q=6$. The filter bank 32 is connected to a sample and hold unit 33 which includes sixteen sample and hold circuits 33-1 through 33-16 in the illustrated example. It should be noted that each of the sample and hold circuits 33-1 through 33-15 is connected to an output end of the corresponding one of the fifteen band pass filters which constitute the band pass filter 32 as described above. It is also assumed that the frequency range gradually increases in a stepwise fashion from 33-1 to 33-15 over the frequency range mentioned above. The sample and hold circuit 33-16 is not connected to any of the band pass filters and it is so structured to retain a data indicating a reference level, such as zero voltage, at all times. In one embodiment, the sampling takes place with a sampling time period Tf of 10 msec, though the present invention should not be limited only to this value.

Each of the sixteen sample and hold circuits 33-1 through 33-16 has its output connected to a corresponding one of contact points 34-1 through 34-16. Also provided is a selector or scanner 35 which scans the contact points 34-1 through 34-16 sequentially in a predetermined manner. It is to be noted that FIG. 14 shows the principle of the structure of the present embodiment, and, in the preferred embodiment, a combination of the contact points 34-1 through 34-16 and the selector 35 may be advantageously replaced by a multiplexer. As will be made clear later, the selector 35 scans the contact points 34 in one of several possible ways. For example, in one embodiment, the selector scans sequentially from the lowest frequency contact point 34-1 to the highest frequency contact point 34-15 and also to the reference contact point 34-16 and then the selector 35 goes back to the lowest frequency contact point 34-1 and scans in a similar manne repetitively. In a modification, however, the selector 35 may skip the reference contact point 34-16. Thus, in this case, the selector 35 scans from contact point 34-1 to contact point 34-15 sequentially in one repetitively. On the other hand, in another embodiment, the selector scans the contact points 34 sequentially in a reciprocating or tow-way manner. That is, in this case, the selector 35 first scans from the lowest frequency contact point 34-1 to the highest frequency contact point 34-15 and then to the reference contact point 34-16 sequentially and then scans in the reversed direction from the reference contact point 34-16 toward the lowest contact point 34-1 sequentially. In this case, the selector 35 scans the contact points 34 back and forth sequentially. In a modification of this second embodiment, the selector 35 skips the reference contact point 34-16, so that the selector 35 scans the contact points 34 between the lowest and highest frequency contact points 34-1 and 34-15 back and forth.

Figure 7:
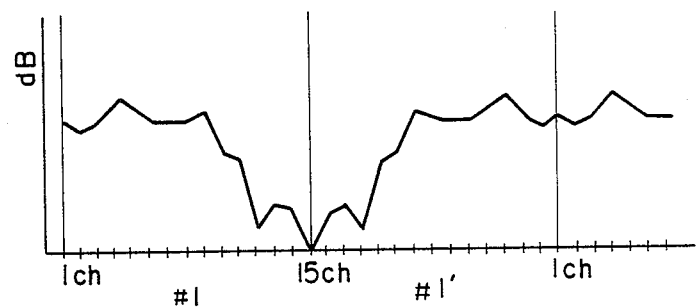
FIG. 7 is a graph showing a series of voice patterns which is obtained by scanning a plurality of band pass filters back and forth over a predetermined number of times during a time period in which the sampled data are maintained in the respective band pass filters in accordance with the technique disclosed in the copending application mentioned above.

What is important in the present invention is the fact that the scanning time period for scanning the contact points 34 once may be comparable to a samplig time period Tf for sampling the frequency analyzed voice signal. As will be made more clear later, this is because the sampled data may be scanned only once for the purpose of the present invention. On the other hand, in accordance with the teaching of the copending application as mentioned above, the scanning of the contact points 34 must be carried out multiple of times, in reality at least four times, during the single sample time period Tf. This is because, in accordance with the teaching of the above-mentioned copending application, the sampled data must be scanned back and forth in multiple of times to form a periodic signal. Described more in detail, in accordance with the teaching of the above-mentioned copending application, the frequency analyzed data sampled in the sampling and holding circuits 34-1 through 34-15 are scanned by the selector 35 back and forth, thereby obtaining a periodic signal as shown in FIG. 7, in which the ordinate is taken for decibel levels and the abscissa is taken for sequentially scanned channel number, which corresponds in function to time. That is, as shown in FIG. 7, a voice pattern #1 is obtained by scanning the contact points from 34-1 to 34-15 and a voice pattern #1' is obtained by scanning the contact points from 34-15 to 34-1 in the reversed direction for the same data held in the sample and hold circuits 33. Since #1 and #1' only constitute half a cycle of a desired periodic signal, the scanning must be carried out at least four times by reversing the direction for the same sampled data. This indicates the necessity to provide a high-speed scanning and processing operation, and if this operation is to be carried out by software, this will slow down the processing speed.

As mentioned above, in accordance with the first embodiment of the present invention, when the frequency analyzed voice data is sampled and held in the sample and hold unit 33, the selector 35 scans the contact points 34 from 34-1 to 34-15 once during the sampling time period Tf, so that there is obtained a voice pattern shown in FIG. 2a as indicated by #1. It is to be noted that, in FIGS. 2a through 2c, the abscissa is taken for channel or filter number N and the ordinate is taken for amplitude level, such as decibel. Then, after elapsing the first sampling time period Tf, the next frequency analyzed voice data is sampled and held in the sample and hold unit 3, the selector 35 similarly scans the contact points 34 from 34-1 to 34-15 only once during the next sampling time period Tf, and, thus a next voice pattern #2 is obtained as shown in FIG. 2b. Similarly, for the frequency analyzed voice data sampled and held for the third time, the selector scans the contact points 34 again from 34-1 to 34-15 to obtain a third voice pattern #3 as shown in FIG. 2c. The process proceeds in a simliar manner as many times as described. Of importance, however, the sampled data is scanned only once to obtain a voice pattern and thus the voice patterns #1 through #3 are the patterns sampled at different time sequences. The present inventors have found that these voice patterns do not change appreciably if the sampling time period is selected reasonably. Based on this finding, it has been found that a pseudo periodic signal may be created by using two or more of such voice patterns sampled at different but adjacent time sequences. This is an approximation approach in creating a periodic signal from a piece of information; however, such an approximation has been found to be extremely accurate and practically quite advantageous as one will fully understand through the reading of this specification.

Figure 6:
FIG. 6 is a graph showing a series of voice patterns as shown in FIGS. 2a through 2c when obtained by scanning a plurality of band pass filters over a predetermined frequency range in a reciprocating manner at a timed sequence in accordance with another embodiment of the present invention.

In accordance with the first embodiment of the present invention, the voice patterns #1 through #3 et seq. are arranged one after another in the order obtained as shown in FIG. 3. Thus, a series of voice patterns shown in FIG. 3 may be viewed as an approximate periodic signal akin to a saw-tooth signal. In the illustrated embodiment shown in FIG. 14, since the reference contact point 34-16 is provided, a zero level data is added at the end of each of a voice pattern or between the two succeeding voice patterns as shown in FIG. 3. It is to be noted, however, the reference contact point 34-16 may be skipped, if desired. In accordance with the second embodiment of the present invention, the contact points 34 are scanned back and forth, and thus the resulting output comprised of a series of voice patterns each obtained during each scanning is as shown in FIG. 6. In this case, since the second scanning is carried out by reversing the scanning direction, the second voice pattern #2' corresponds to the reversed version of voice pattern #2 shown in FIG. 2b. By the same token, in the series of voice patterns shown in FIG. 6, the even numbered voice patterns are reversed due to the reversed scanning direction. As a result, the signal obtained by this second embodiment is an approximate triangular shaped periodic signal as indicated by the one-dotted line in FIG. 6. In the illustrated embodiment, since the reference contact point 34-16 is provided as shown in FIG. 14, a zero level data is added between the end of an odd-numbered pattern and the beginning of an even-numbered pattern. However, if desired, the reference contact point 34-16 may be discarded. It can thus be understood that a periodic signal useful for extracting a high frequency component can be constructed by an approximation technique in accordance with the present invention. Although it is an approximation, there is no degradation in terms of extraction of desired information from a practical view point.

Returning to FIG. 14, the scanned data is then supplied to an analog-to-digital converter or simply A/D converter 42, where each of the scanned data is converted into a corresponding digital quantity with a resolution of 12 bits. As a result, there is obtained a digitized time spectral pattern for each frame. The digital data is then supplied to a high pass filter 36 which allows only a high frequency component of the digitized voice data to be output. As mentioned before, in the case of a voice signal, since the high frequency component is an important information for identification of a voice signal, the high frequency output thus obtained is supplied to a buffer 37 for storage into a memory (not shown) connected to an output terminal 41. As is well known for one skilled in the art, a voice recognition system typically has two modes of operation: registration mode and recognition mode. In other words, a variety of spoken words or sounds are first input and processed one after another to store feature quantities, such as extracted high frequency components, as known voices in the registration mode. And, then, the voice recognition mode may be operated in the recognition mode, in which an unknown voice may be input and processed for identification by comparing with the previously stored known voices.

Figure 4:
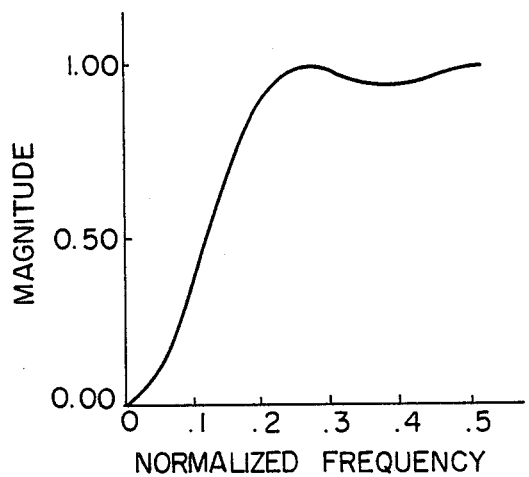
FIG. 4 is a graph showing the characteristic of the high pass filter shown in FIG. 1 with the abscissa taken for normalized frequency and the ordinate taken for the magnitude of amplitude.

The high pass filter 36 illustrated in FIG. 14 has a digital linear phase high pass filter whose frequency characteristic is graphically shown in FIG. 4. As this filter 36, use is preferably made of a CIC filter which is equivalent in function to a FIR filter having a single coefficient. As well known, although a CIC filter is a linear phase low pass filter by itself, it can be constructed into a high pass filter by providing a cascade connection, phase matching and an addition function. The detailed structure of such a filter is shown in FIG. 1, and the functional relationship provided by such a filter may be expressed as follows:

$$H(Z) = Z^{-3} - \left(\frac{1}{4}\frac{1-Z^{-4}}{1-Z^{-1}}\right)^2.$$

Figure 5A:
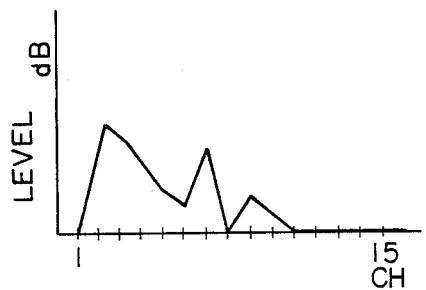
FIGS. 5a through 5d are graphs which are useful for understanding the effect of the present invention in comparison with the prior art.
Figure 5B:
Figure 5C:
Figure 5D:
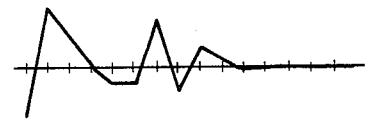

FIG. 5a shows an example of voice spectral data obtained by single scanning. FIG. 5b shows a result when the data of FIG. 5a has been processed by the so-called least square method which has been used conventionally. FIG. 5c shows a result when processed by the technique described in the above-mentioned copending application. And, FIG. 5d shows a result when processed by the first embodiment of the present invention.

Returning to FIG. 14, the system further includes an up/down counter 39 which may be selectively operated as a simple up or down counter or an up/down counter as set by a control circuit 40. When the counter 39 is selected to serve as a simple up counter, then the selector 35 scans the contact points 34 from 34-1 to 34-16 repetitively, and, thus this corresponds to the first embodiment described above. On the other hand, when the counter 39 is selected to serve as an up/down counter, then the selector 35 scans the contact points 34 back and forth between 34-1 and 34-16, so that this corresponds to the above-described second embodiment of the present invention. A timer 38 is also provided in the system of FIG. 14 and it sets the sampling time period Tf. As a further modification, even if the counter 39 remains to operate as an up/down counter, the control circuit 40 may be so structured to reverse the data temporarily stored in the buffer 37 every two frames, in which case the system can operate in the mode of the first embodiment even if the counter 39 functions as an up/down counter 39. By the same token, the system may be operated in the mode of the second embodiment while using the counter 39 as an up or down counter if the data stored in the buffer 37 is reversed by the control circuit 40 every two frames.

Figure 12:
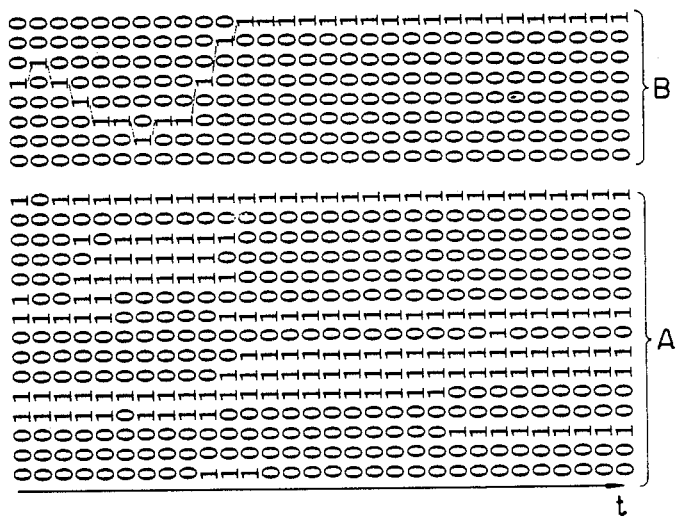
FIGS. 12 and 13 are schematic illustrations which are useful for understanding the advantage of the system shown in FIG. 8.
Figure 13:
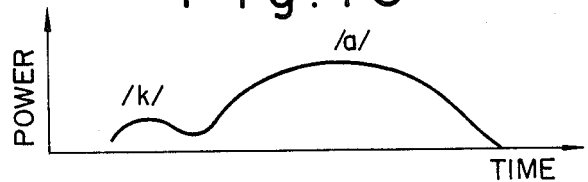

FIGS. 12 and 13 show a specific example when a monosyllabic sound "ka" is processed through a voice processing system which processes a voice signal to produce a power signal as a function of time. The time-dependent voice power distribution for "ka" is shown in FIG. 13 whose abscissa is taken for time and ordinate is taken for voice power level. FIG. 12 shows a combined binary voice distribution pattern obtained by subjecting a voice signal and the signal shown in FIG. 13 to binary conversion processing, and thus the combined pattern includes a time-frequency distribution pattern segment A and a voice power distribution pattern segment B. It should be understood that, in the present example, use is made of 15 band-pass filters for frequency analysis and the voice power level is divided into 8 levels. The voice signal is sampled at a time interval of 10 milliseconds and it is subjected to frequency analysis and at the same time voice power level analysis, so that each frame includes 15-bit data for the time-frequency pattern segment A and 8-bit data for the voice power pattern segment B. Such a frame is created in a timed sequence and arranged in a sequential order to define the combined voice pattern shown in FIG. 12. As indicated by the one-dotted line in the voice power pattern segment B, the location of "1" in each of the frames corresponds to the amplitude of the voice power signal shown in FIG. 13. It should be noted that the voice power segment B of each of the frames includes only one binary data "1".

Figure 8:
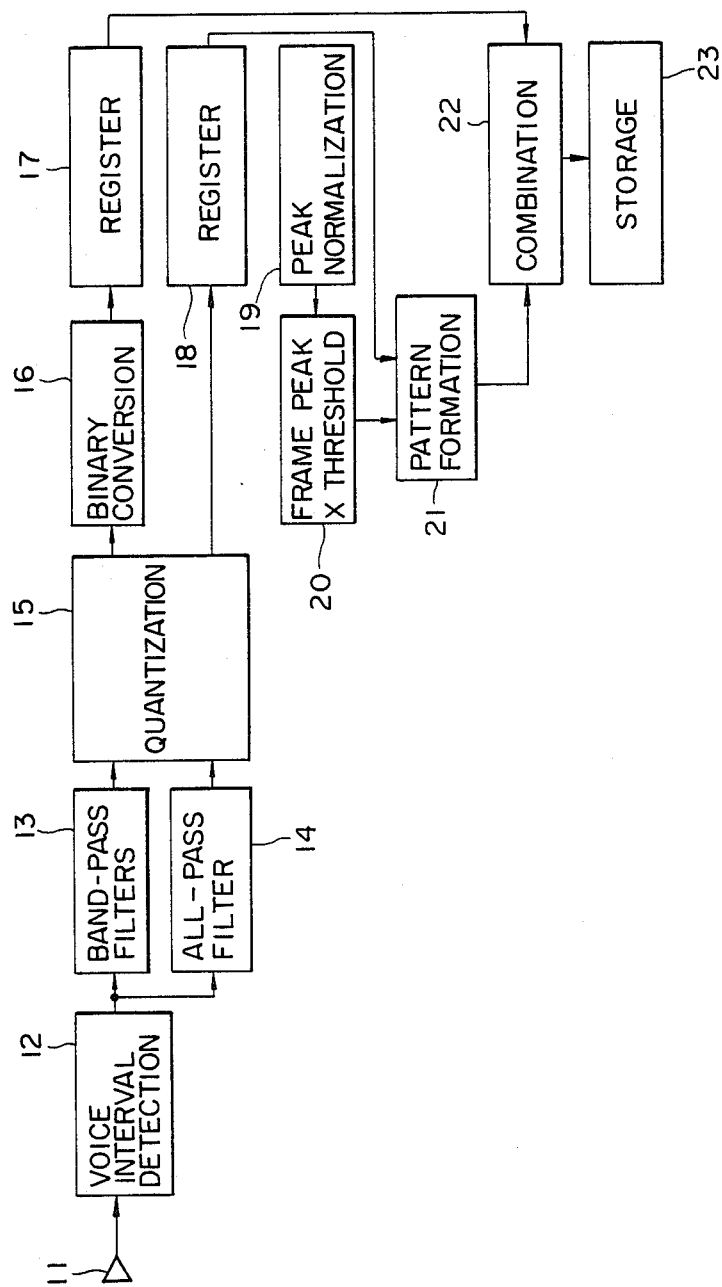
FIG. 8 is a block diagram showing a voice recognition system which is constructed in accordance with one embodiment of the present invention and to which the above-described voice feature extraction technique may be advantageously applied.

FIG. 8 shows a voice pattern forming system suitable for use in a voice pattern recognition system constructed in accordance with a further embodiment of the present invention. That is, the voice pattern forming system shown in FIG. 8 is so designed to form a combined binary voice pattern including a voice power pattern segment and a voice time-frequency distribution pattern segment. In the present embodiment, however, the voice power pattern segment of each of the frames of a combined binary voice pattern is so formed to include two or more binary data "1", i.e., a top voice power range being calculated by multiplying a predetermined ratio to the amplitude of the voice power signal and those of the predetermined voice power levels which correspond to the thus calculated top voice power range are assigned "1" with rest being assigned "0."

Figure 9:
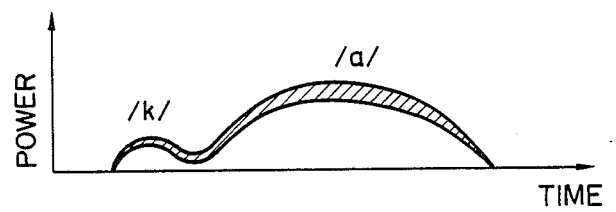
FIG. 9 is a schematic illustration which is useful for understanding the principle of the operation of the system shown in FIG. 8.
Figure 10:
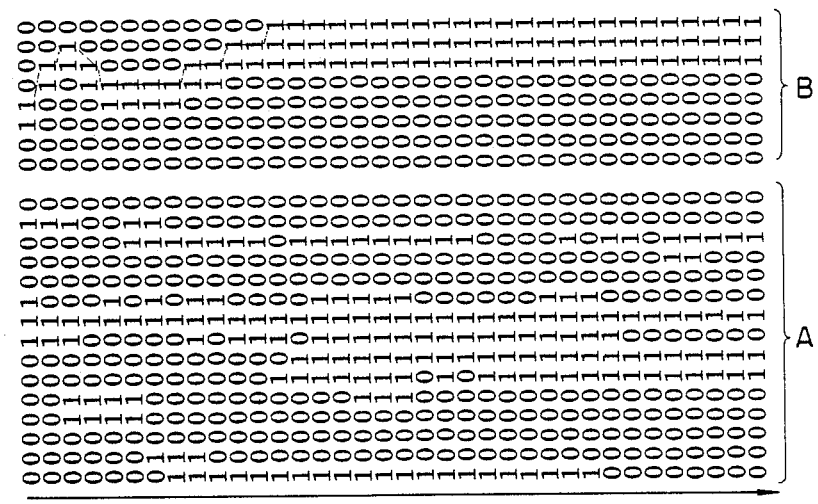
FIG. 10 is a schematic illustration showing a combined time-dependent frequency and voice power pattern which is also useful for understanding the operation of the system shown in FIG. 8.

The voice pattern forming system shown in FIG. 8 includes a microphone 11 for converting a voice in the form of pressure waves into an electrical voice signal and a voice interval detector 12 which determines the voice interval of the electrical voice signal by comparing the electrical voice signal with a predetermined threshold voice level. The voice interval detector 12 is connected to a frequency analyzer 13 comprised of a plurality (15 in the present example) of band-pass filters different in frequency range and also to an all-pass filter 14. A quantization unit 15 is provided to receive filtered signals from the band-pass filters 13 and also from the all-pass filter 14 and thus the filtered voice signals are subjected to quantization at a time interval of 10 milliseconds. The signal from the band-pass filters 13, after quantization, is supplied to a binary converter 16, where a binary time-frequency distribution pattern as shown by the segment A in FIG. 10 is formed, which is then stored in a register 17 as one voice. At the same time, the voice signal processed through the all-pass filter 14, after quantization at 15, is stored into another register 18 as one voice. The peak value of the data stored in the register 18 is detected and the data in the register 18 is normalized such that the peak data corresponds to the highest (8th in the present example) of a predetermined number of voice power levels at a peak/normalization unit 19. After normalization, a local peak in each frame is detected and a predetermined threshold, e.g., 20% from the peak, is multiplied to the local peak at a unit 20 to determine the top range of each frame, as indicated by the shaded area in FIG. 9. And, those of the eight power levels which fall onto the thus calculated to prange of each frame are assigned "1" with the rest assigned "0" at a pattern formation unit 21. The resulting voice power pattern is shown in the segment B in FIG. 10. That is, in accordance with the present pattern forming system, the voice power pattern segment of each frame includes two or more binary "1s" and thus the rate of recognition can be enhanced. The voice power pattern thus formed at 21 is then combined with the voice time-frequency pattern stored in the register 17 at a combination unit 22 to define a combined voice pattern shown in FIG. 10, which is then stored in a storage unit 23.

Figure 11:
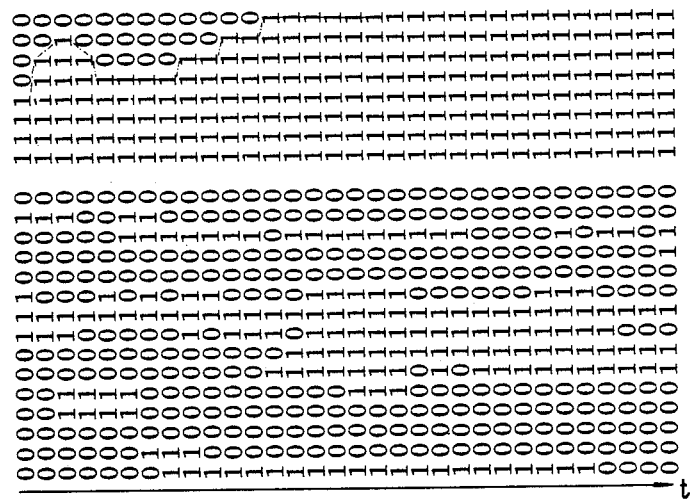
FIG. 11 is a schematic illustration showing another example of combined time-dependent frequency and voice power pattern which may also be advantageously used in the system shown in FIG. 8.

FIG. 11 shows a combined binary voice pattern in the case where the threshold is set at 100%, i.e., all of the predetermined voice power levels corresponding to the amplitude of the voice power signal being assigned "1."

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A voice signal processing method, comprising:
   subjecting a voice signal to frequency analysis to produce a voice frequency spectral pattern having a predetermined frequency range;
   sampling said pattern successively at a predetermined time interval;
   arranging the sampled patterns in the order of occurrence in timed sequence, thereby forming an approximate periodic signal, said step of arranging including scanning each of said sampled patterns once in a predetermined manner and said scanning being carried out from a first end of said frequency range to a second end of said frequency range in one direction once for each of said sampled patterns; and
   extracting a high frequency component from said approximate periodic signal.

2. The method of claim 1 wherein a predetermined reference data is added for each scanning.

3. The method of claim 2 wherein said reference data is added after said second end.

4. The method of claim 1 wherein said scanning is carried out between first and second ends of said frequency range by reversing a scanning direction between the first and second ends for each of the successive sampled patterns.

5. The method of claim 4 wherein a predetermined reference data is added for each scanning.

6. The method of claim 5 wherein said reference data is added after said second end.

7. A voice signal processing system, comprising:
   analyzing means for subjecting a voice signal to frequency analysis to produce a frequency spectral pattern over a predetermined frequency range;
   sampling and storing means for sampling and storing said frequency spectral pattern successively at a predetermined time interval;
   scanning means for scanning said frequency spectral pattern stored in said sampling and storing means in a predetermined manner once while said frequency spectral pattern is stored in said sampling and storing means, thereby forming a substantially periodic signal from a series of said frequency spectral patterns, said scanning means scanning outputs of said sampling and storing means once in a predetermined direction during a time period which said frequency spectral data is stored in said sampling and storing means and said scanning direction being reversed each time when said scanning means scans the outputs of said plurality of sampling and storing means; and
   extracting means for extracting a high frequency component from said periodic signal, whereby said high frequency component constitutes a feature parameter of said voice signal.

8. The system of claim 7 wherein said analyzing means includes a filter bank comprised of a plurality of band pass filters each having a different band pass frequency range and connected to said sampling and storing means.

9. The system of claim 8 wherein said sampling and storing means includes a plurality of sampling and storing circuits each connected to receive a frequency analyzed data from the corresponding one of said plurality of band pass filters.

10. The system of claim 7 further comprising an analog-to-digital converting means interposed between said scanning means and said extracting means.

11. The system of claim 10 wherein said extracting means includes a digital high pass filter.

12. A voice signal processing method, comprising the steps of:
    subjecting a voice signal to frequency analysis to produce a voice frequency spectral pattern having a predetermined time interval;
    sampling said pattern successively at a predetermined time interval;
    arranging the sampled patterns in the order of occurrence from a first end of a frequency range to a second end of said frequency range repetitively or between said first and second ends reciprocatingly in timed sequence, thereby forming an approximate periodic signal having a relatively low frequency component and a relatively high frequency component; and
    extracting said high frequency component from said approximate periodic signal.

13. A voice signal processing system, comprising:
    analyzing means for subjecting a voice signal to frequency analysis to produce a frequency spectral pattern over a predetermined frequency range;
    sampling and holding means for sampling and holding said frequency spectral pattern successively at a predetermined time interval;
    scanning means for scanning said frequency spectral pattern stored in said sampling and holding means in a predetermined manner once while said frequency spectral pattern is stored in said sampling and holding means, thereby forming a substantially periodic signal having a relatively high frequency component from a series of said frequency spectral patterns, said scanning means scanning outputs of said plurality of sampling and holding means once in a predetermined one direction during a time period while said frequency spectral data is stored in said sampling and holding means, the scanning direction being reversed each time from a first end of a frequency range to a second end of said frequency range repetitively or between said first and second ends reciprocatingly when said scanning means scans the outputs of said plurality of sampling and holding means; and
    extracting means for extracting said high frequency component from said periodic signal, whereby said high frequency component constitutes a feature parameter of said voice signal.

* * * * *